April 17, 1928.
J. KRIES
LOCKING DEVICE
Filed April 28, 1927
1,666,783
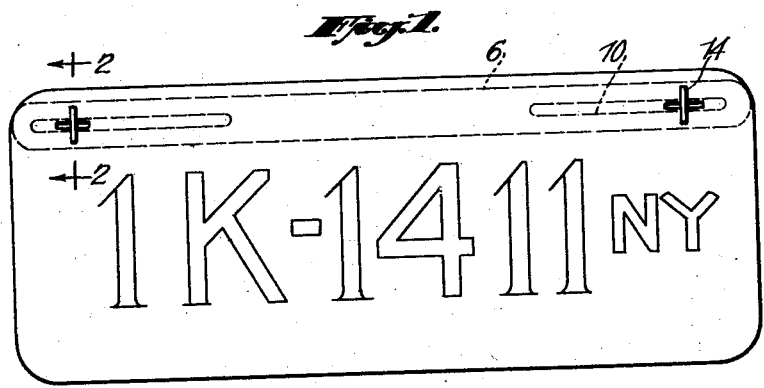
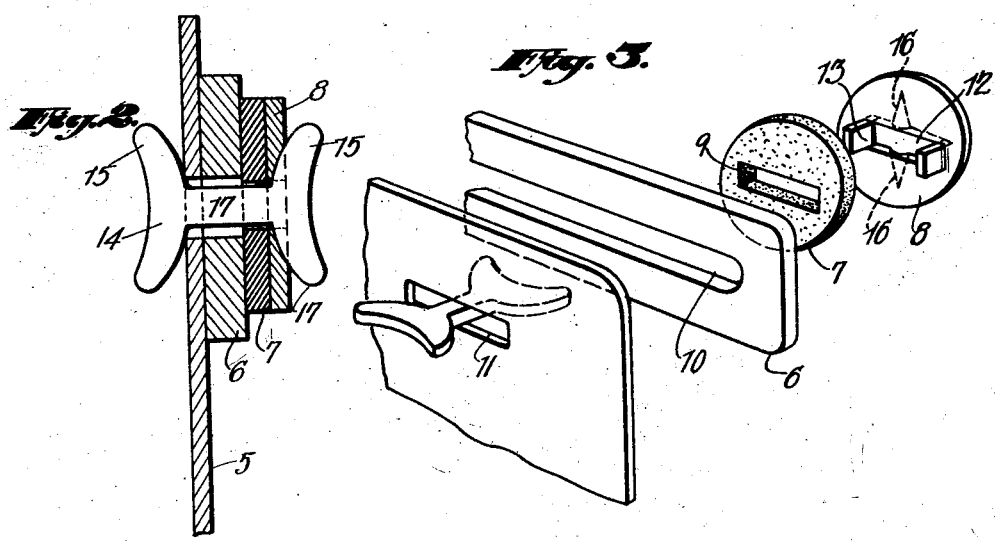
INVENTOR
John Kries.
BY
ATTORNEY Patented Apr. 17, 1928.

1,666,783

UNITED STATES PATENT OFFICE.

JOHN KRIES, OF BROOKLYN, NEW YORK.

LOCKING DEVICE.

Application filed April 28, 1927. Serial No. 187,383.

This invention relates to locking devices and in particular to one adapted for use in connection with automobile license plates and license plate holders.

A particular object of the invention is to provide a locking device which can be readily manipulated to lock a plurality of members together so that when they are subjected to continuous jarring and jouncing, they will not be separated and lost.

A particular object of the invention, therefore, is to provide a locking member which can be readily manipulated to effectively lock together a plurality of members without the use of bolts employing screw threads or other like medium which are subject to loosening during constant jarring, such as is present in vehicle license plates and plate holders.

A still further object of the invention is to provide a simplified locking device which may be sold at small cost and which is effective to securely lock together a plurality of members so that no amount of jolting or jarring will cause the locking member to become accidentally misplaced, resulting in a loss of one of the members.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a front view in elevation of a license plate and license plate holder connected together with my improved locking device.

Figure 2 is an enlarged sectional view taken on the line 2—2 of Figure 1 showing the position of my locking device when the same is inserted in position to hold a license plate in connection with a license plate holder.

Figure 3 is a view in perspective of the license plate, license plate holder, resilient washer and lock washer, all as they would appear if separated preparatory to assembling to receive the locking member.

Referring to the drawings in detail 5 indicates a license plate and 6 a license plate holder, although these are only used to illustrate an instance in which my locking device may be employed, it of course being understood that the device may be employed to lock any number of elements together to prevent their coming accidentally disengaged through jarring, jouncing or other vibratory motion. In order to join the license plate holder and the license plate securely together, I make use of a rubber washer 7 of sufficient thickness to form a resilient pad member between the lock washer 8 and the license plate holder 6, the rubber washer 7 being provided with an elongated slot 9 which is arranged to match the slot-like opening 10 in the license plate holder 6, a suitable slot 11 being also provided in the upper corner of the license plate to match with the slot 10 of the license plate holder 6 and the slot 9 of the rubber washer 7. Reference is made to a rubber washer in this instance but it is of course understood that this washer may be made of any resilient substance, such as rubberized leather or felt which will act as a filler between the lock washer 8 and the license plate holder 6, and referring to the lock washer 8, it will be noted that the same is provided with a horizontally extending slot 12 which is formed by punching out of the material of the lock washer, the positioning tongues 13 which project forwardly from the surface of the locking washer 8 and are adapted to pass through the slot 9 of the rubber washer 7 and have their ends positioned in the slot 10 of the license plate holding plate 6. These positioning tongues prevent rotation at the lock washer 8 when the winged locking device or member 14 is passed through the slots 9, 10, 11 and 12 and revolved to position as shown in Figure 1 and Figure 2 so that its winged portions 15 are in vertical position and rest in the locking depressions 16 formed on the outer face of the lock washer 8, these locking depressions being somewhat semi-conical and opening from the slot 12. It will be evident that the arcuate shaped underside of the wings 15 are adapted to snap into these depressions 16 and the rubber washer having been compressed during the revolving movement of the locking member, will expand and cause the locking member 14 to be securely seated in the depressions 16.

These cam surfaces of the locking member 14 are most important in view of the fact that they compress between the wings 15 the parts to be joined.

The washer 7 may be placed between the license plate and holder if desired.

It is evident therefore, that I have provided a locking member which, while only one was described, may be used in any number to bind a license plate to a license plate holder or may be used to bind any number of members together to which it may be adapted, it of course being understood that the shank portion 17 of the winged locking member may be lengthened to accommodate any number of parts to be joined together and the locking member may be made of any suitable size to carry out the work for which it is designed, it being understood that the cam surfaces of the wings 15 will effectively force together any pieces to be held in close relation and the cam surface when once positioned in the depression 16 of the lock washer 8 will effectively hold the parts together and no amount of vibration will loosen the locking member because it is firmly seated in the depression 16 and the resiliency of the rubber washer between the lock washer 8 and the piece of metal adjoining it will always retain the washer in connection with the locking member.

It is evident, therefore, that I have provided an improved locking member which will effectively carry out the work for which it has been designed and which can be made up at small cost and will not be lost or jarred loose from its holding position by vibration.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. The combination with a plurality of members having openings therein and arranged to be secured together, of a locking device comprising a locking member, a locking washer, tongues on the washer arranged to enter the opening in one of the members to be secured and a resilient pad interposed between said member and said washer whereby the locking member will be resiliently maintained in its locking position.

2. The combination with a plurality of members having openings therein and arranged to be secured together, of a locking device comprising a locking member having a shank and arcuate shaped ends on the shank, a locking washer having tongues thereon and depressions in the outer face thereof, a resilient member having an opening therein disposed between the washer and one of the members to be secured, the tongues of the washer being arranged to pass through the opening of the resilient member and into the opening of one of the members to be secured whereby the lock washer is prevented from rotating and the arcuate shaped ends being adapted when rotated to secure the members together and to resiliently seat in the depressions of said locking washer.

In testimony whereof I affix my signature.

JOHN KRIES. [L. S.]